Aug. 13, 1957  G. E. BROOKBANK  2,802,540
LOAD SUPPORT MOUNTED FOR RETRACTION INTO VEHICLE COMPARTMENT
Filed April 19, 1954  3 Sheets-Sheet 2

INVENTOR
Glen E. Brookbank
BY L. D. Burch
ATTORNEY

Aug. 13, 1957 G. E. BROOKBANK 2,802,540
LOAD SUPPORT MOUNTED FOR RETRACTION INTO VEHICLE COMPARTMENT
Filed April 19, 1954 3 Sheets-Sheet 3
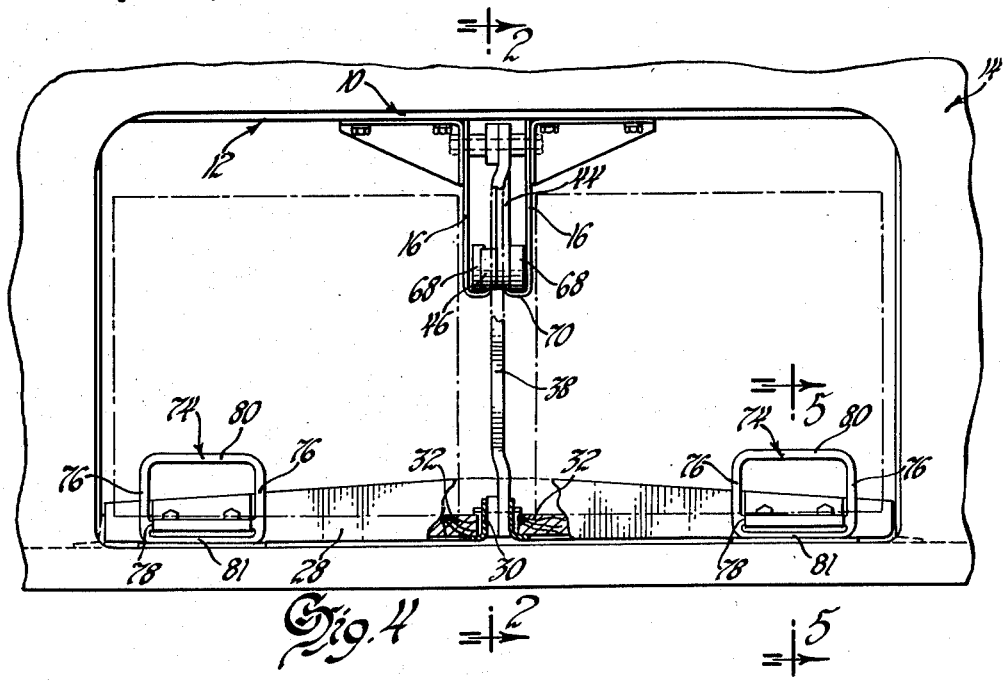
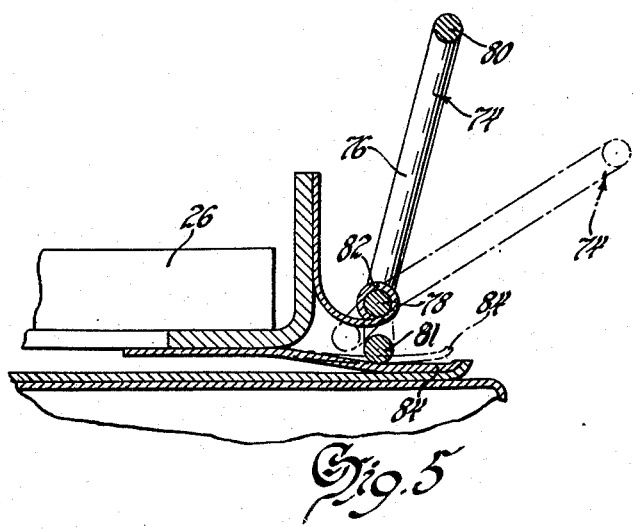
INVENTOR
Glen E. Brookbank
BY
L. D. Buch
ATTORNEY United States Patent Office 2,802,540
Patented Aug. 13, 1957

2,802,540

LOAD SUPPORT MOUNTED FOR RETRACTION INTO VEHICLE COMPARTMENT

Glen E. Brookbank, Rochester, Mich., assignor to General Motors Corporation, Detroit, Mich., a corporation of Delaware Application April 19, 1954, Serial No. 424,048

13 Claims. (Cl. 180—68.5)

The present invention relates to support means and more particularly to means for mounting a heavy storage battery so that it may be moved with a minimum amount of effort.

In heavy duty vehicles such as buses or trucks, the storage batteries are frequently placed underneath the vehicle because of space limitations. Heretofore, the batteries have been mounted on a movable platform in order to make these batteries easily accessible for servicing. To facilitate movement of the batteries, the platform may be provided with a plurality of rollers that support the platform and travel on a pair of parallel rails. However, this has not proved entirely satisfactory. Since the battery compartments are frequently subjected to freezing conditions and exposed to road dust and dirt, there are usually accumulations of foreign matter which interfere with movement of the rollers along the rails. Since the batteries are necessarily very heavy, this makes it very difficult, if not impossible, to move the batteries.

It is proposed to provide support means for carrying the batteries into and out of the battery compartment without interference from exposure to the large volume of road dust, etc. present in the battery compartment. This is to be accomplished by suspending the battery rack or platform from an overhead support by means of a pantographic linkage. The linkage may include a large parallelogram and a small parallelogram. The diagonally opposite corners of the large parallelogram may be secured to the vehicle frame and the battery platform while a joint in the smaller parallelogram may be provided with rollers that travel on an overhead track. Thus when it is desired to remove the batteries from the battery compartment, the platform may be pulled out of the compartment. During such movement, the rollers will travel along the overhead track and the linkage will carry the weight of the platform and batteries.

Since the batteries are very heavy and unwieldly, it is desirable that the battery platform be suspended near the center of gravity so as to be balanced when the batteries are positioned thereon. However, when the platform and the batteries are very nearly balanced, there may be a tendency for the platform to tip over and cause the batteries to be upset.

In order to prevent the platform tipping over, means may be provided for limiting the amount of pivotal movement of the platform. In the present instance the arms of the pantographic linkage may be positioned to abut against the platform when the batteries are in the fully opened or fully closed position. Thus when the batteries are in or out of the compartment, the arms will limit the tilting movement of the platform and prevent upsetting thereof.

Since the battery rack will include antifriction means that make it very easy for the battery and platform to move, it is desirable to employ locking means to retain the platform in one position and thereby prevent the rack accidentally moving from the closed position to the open position.

Accordingly, it is proposed to provide handles which have cam means thereon that are adapted to support the weight of the platform. The handles may be formed so that they will engage the vehicle chassis and support at least a portion of the weight of the platform and prevent movement thereof. These handles may be constructed so that when the operator pulls on them, they will turn and automatically cause the cam means to disengage the vehicle chassis and allow the platform to move out of the compartment. Over center spring means may be provided for retaining the handle and cam means in the locked position.

In the three sheets of drawings:

Fig. 4 is a front elevational view of the battery rack of Fig. 1.

Fig. 5 is a cross sectional view taken substantially in the plane of line 5—5 of Fig. 4 and showing the locking handle.

Figure 1:
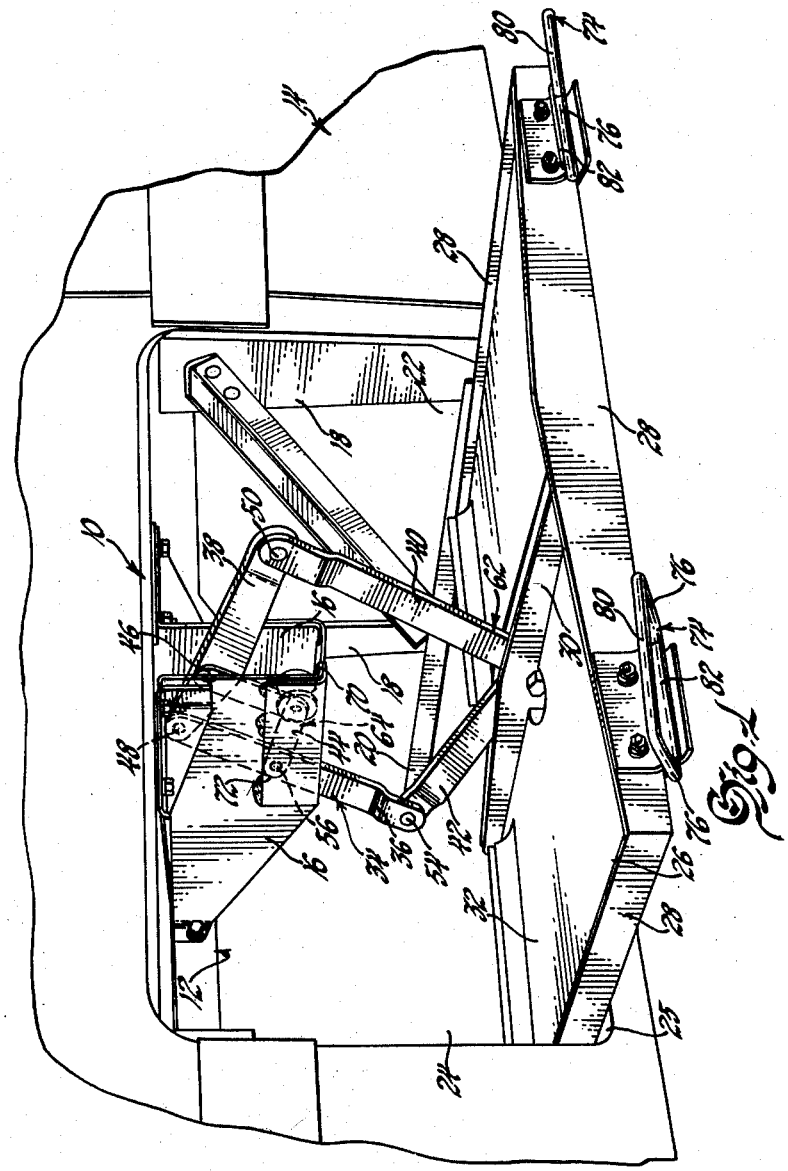
Fig. 1 is a fragmentary view of a proportion of the under carriage of a vehicle having a battery rack employing the present invention.

Referring to the drawings in more detail, this invention may be embodied in any suitable supporting rack 10. In the present instance the rack 10 is suspended from the chassis 12 of a vehicle 14 such as a bus, and is particularly adapted for carrying batteries (not shown) for the vehicle's 14 electrical system.

The vehicle chassis 12 may include a framework having a pair of overhead members 16 and a plurality of braces 18 secured thereto. A plurality of substantially horizontal channel members 20 may be secured to the lower ends of the braces 18 so as to form a compartment 22. This compartment 22 is adapted to receive the batteries and the rack 10 and is accessible through an opening 24 having a sill 25 in the side of the vehicle. If desired a panel may be secured in this opening 24 which conforms to the exterior of the vehicle and conceals the batteries.

The battery rack 10 may include a platform 26 for receiving and supporting the batteries. Although the platform 26 may be of any suitable construction, in the present instance, it includes a plurality of rigid edge members 28 that are secured together to form a rectangle and a pair of rib members 30 that extend across the middle of the platform 26. If desired a rigid member such as a piece of plywood 32 may be secured between the members 28 and 30 to form a floor for the batteries to rest on.

In order to facilitate movement of the platform 26 into and out of the compartment 22, the rack 10 may include a suitable linkage system 34 for suspending the platform 26 from the overhead members 16. In the present instance this linkage 34 is in the form of a pantograph which has a plurality of rigid arms 36, 38, 40 and 42, 44, 46 that are secured together by a plurality of pivotal joints 48, 50, 52, 54, 56, 58 and 60 to form a large parallelogram 62 and a smaller parallelogram 64.

The four longer arms 36, 38, 40 and 42 are secured together to form the large parallelogram 62 which has two pairs of diagonally opposite corners or joints 48—52 and 50—54. The joint 48 may include a pin 66 that extends through registering openings in the overhead members 16 so as to pivotally support the pantograph 34, the diagonally opposite corner 52 may be secured between the rib members 30 in the platform 26. A pair of shorter arms 44 and 46 may be pivotally secured to the center portions of the longer arms 36 and 38 to form the second or smaller parallelograms 64. This parallelogram 64 will include pivot joints 48, 56, 58 and 60. The pivot joint 60 in the little parallelogram 64 opposite the joint 48 may be provided with rollers 68 which may be adapted to travel along a track 70 on the overhead members 16. In the present instance this track is formed by turning the edges of the overhead members 16 inwardly and providing a pair of reinforcing plates 72. These plates are secured to the sides of the overhead members 16 so as to extend under the tracks 70 and reinforce them.

It may be seen that this linkage system 34 of a large and small parallelograms 62 and 64 forms a pantograph in which the jonits 52 and 60 will follow similar paths. Thus it may be seen that when the track 70 is substantially straight and horizontal, the platform 26 will move in a substantially straight and horizontal line. Accordingly, the linkage 34 will carry the platform 26 in a substantially horizontal path above the channels 20, and the platform 26 and batteries may be easily moved into and out of the battery compartment 22 without interference from the supporting structure.

In order to facilitate movement of the platform 26 into and out of the compartment, a pair of handles 74 may be provided on the front of the platform 26. Each handle may have a pair of parallel end members 76 with a bearing bar 78 extending between the centers thereof. The upper ends of the members 76 may be connected by a grip 80 and the lower ends by a cam member 81. The center bars 78 may be pivoted in brackets 82 projecting from the front member 28 of the platform 26 so that the grip 80 can be swung toward and away from the platform 26. Cam means may be formed by a spring 84 that projects outwardly from the bottom edge of the platform 26 and the member 81. Thus as the grip 80 swings upwardly toward the platform 26, the spring 84 will be forced downwardly, and as the grip 80 swings away from the platform 26, the spring 84 will rise. The handles 74 may be mounted on over centers so that the spring action will tend to retain the grip 80 against the front of the platform 26.

Figure 2:
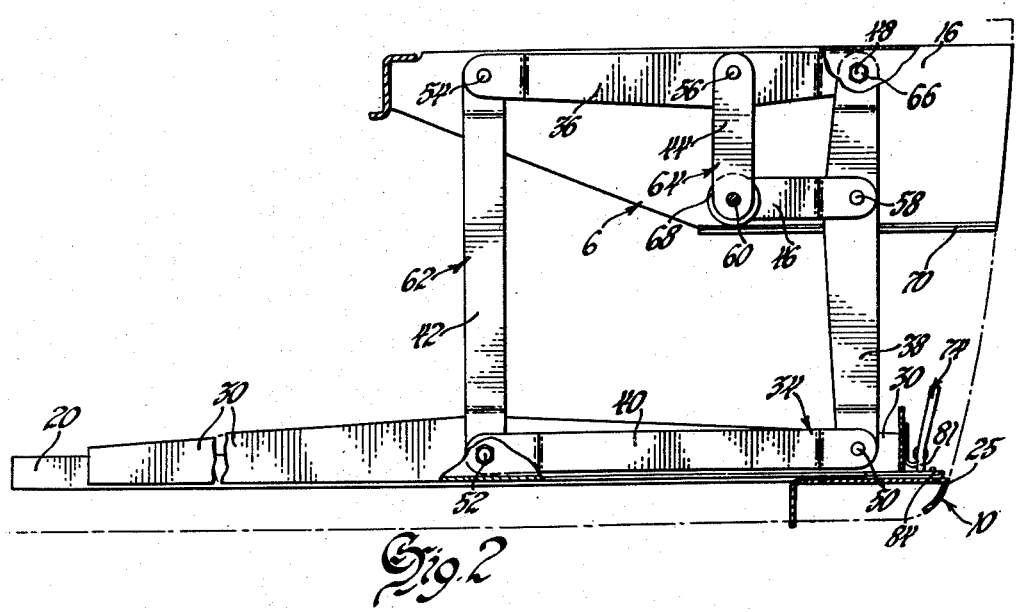
Fig. 2 is a side elevational view taken substantially along the plane of line 2—2 in Fig. 4 showing the battery rack locked in the fully closed position.

When the platform 26 is in the fully closed position such as shown in Fig. 2, the arms 36 and 40 will be substantially horizontal and the arms 38 and 42 will be substantially vertical. It should be noted that the horizontal arm 40 will be disposed between the rib members 30 so as to rigidly engage the platform 26. This will tend to retain the platform 26 horizontal and prevent it turning counterclockwise as seen in Fig. 2. When the platform 26 is in the compartment and the grips 80 are adjacent the front of the platform 26, the platform 26 will be locked in position. It may be seen that when the handles 74 are so positioned, the cam end 81 will force the spring 84 down against the sill 25. This will in turn raise the front of the platform 26 and force it counterclockwise against the arm 40 so as to lock the platform 26 in the closed position.

When it is desired to service the batteries, the operator may pull on the grips 80 of each handle 74. This will cause the handles 74 to swing into the position indicated by the dash-dot line of Fig. 5. The cam end 81 will then disengage the spring member 84 and allow it to disengage the sill 25. If the operator continues to pull, the platform 26 will move out of the compartment 22 carrying the batteries therewith.

Figure 3:
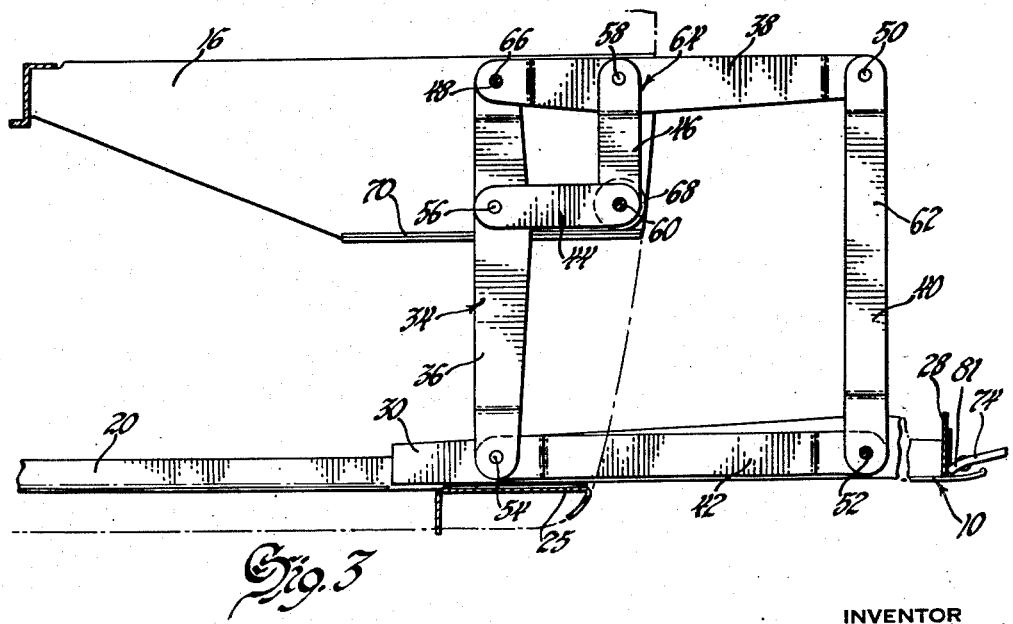
Fig. 3 is a side elevational view similar to that of Fig. 2 showing the battery in the fully extended position.

As this movement continues the large parallelogram 62 will turn on the joint 48 having the pin 66 in the overhead member 16. As the linkage 34 pivots on this pin 66, it will move from the position in Fig. 2 through the position in Fig. 1 to the position in Fig. 3. During this movement the rollers 68 will travel along the track 70. It should be observed that the entire weight of the batteries and the rack will be supported by the rollers 68 on the track 70 and the pin 66. In addition, the platform 26 will move in a path similar to the track 70 and free of the chassis members. When the platform 26 reaches the fully extended position, the arm 42 will engage the platform 26 and prevent it rotating clockwise and upsetting the batteries.

When the batteries have been properly serviced the operator merely pushes the platform 26 and batteries toward the compartment 22. As the platform 26 moves into the compartment 22, the linkage 34 will rotate toward the position in Fig. 2 and the rollers 68 will travel on the track 70. When the batteries are returned to their normal position, the operator may lift on the grips 80 so as to turn the handles 74. This will move the cam members 81 against the springs 84 and force the springs against the sill 25 which in turn locks the batteries and rack 10 in the retracted position.

While only one embodiment of the present invention has been shown, it should be understood that numerous changes and modifications may be made without departing from the spirit thereof. For instance, although it has been shown as adapted for a battery rack, it should be understood that it might be employed in any retractable support such as a step, etc.

What is claimed is:

1. Means for retractably supporting a platform for movement into and out of a compartment formed in a relatively stationary frame, said means comprising a pantographic linkage, said linkage including a joint adapted to be pivotally mounted on said frame for allowing swinging movement of said pantographic linkage about said joint, said linkage also being adapted to be secured to said platform for carrying said platform into and out of said compartment, anti-friction means mounted on said linkage for travel on guide means secured to said frame for supporting said linkage and said platform during movement thereof into and out of said compartment, said anti-friction means being positioned on said linkage for causing said platform to travel on a path determined by the shape of said guide means during said movement.

2. Means for retractably supporting a platform for movement into and out of a compartment formed in a relatively stationary frame, said means comprising a linkage having a plurality of rigid arms pivotally secured together to form a polygon, a second linkage having a plurality of rigid members attached to each other and to at least some of said arms to form a second polygon which is interconnected with said first polygon, said linkages being adapted to be pivotally supported by said frame for swinging movement within said compartment, one of said linkages being secured to said platform, the other of said linkages having anti-friction means thereon adapted to travel along guide means secured to said frame for supporting said linkages and said platform during movement thereof into and out of said compartment, said anti-friction means being positioned on said linkage for causing said platform to follow a path determined by the shape of said guide means.

3. Means for retractably supporting a platform for movement into and out of a compartment formed in a relatively stationary frame, said means comprising a plurality of rigid links, said links being pivotally secured together by a plurality of joints to form a pair of interconnecting polygons, said polygons having at least one common joint and at least two common links, one of said polygons having anti-friction means adjacent the joint opposite said common joint, guide means secured to said frame, said anti-friction means being positioned for movement along said guide means, the other of said polygons having a joint opposite said common joint adapted to be secured to said platform.

4. Means for retractably supporting a platform for movement into and out of a compartment formed in a relatively stationary frame, said means comprising a plurality of links pivotally secured together by joints to form a quadrilateral, one of said joints being adapted to be secured to said frame and the diagonally opposite joint being adapted to be secured to said platform, a second set of links connected to each other and a pair of said first set of links to form a second quadrilateral, one of the joints in said second quadrilateral having roller means thereon, a track supported by said framework, said roller means being adapted to travel along said track.

5. Support means for retractably carrying a load into and out of a compartment formed in a relatively stationary frame, said support means comprising a track secured to said frame, a plurality of rigid links having the ends thereof connected together by pivotal joints to form a parallelogram, the first of said joints being secured to said framework, a load carrying platform pivotally secured to the joint diagonally opposite said first joint, a pair of arms secured to an adjacent pair of links in said first parallelogram to form a second parallelogram having a second set of joints, said second parallelogram being substantially similar to said first parallelogram, one of said joints in said second parallelogram having rollers thereon positioned to travel along said track and support said platform during movement of said platform into and out of said compartment.

6. A rack for retractably supporting battery means for movement into and out of a relatively stationary frame, said rack comprising a platform for carrying said battery means, four links having their ends connected together by pivotal joints to form a parallelogram, one of said joints being secured to said platform and the diagonally opposite joint being adapted to be secured to said frame, a pair of arms secured to each other and an adjacent pair of said links by a second set of joints to form a second parallelogram substantially similar to said first parallelogram, one of the joints in said second set having roller means thereon, a track secured to said frame for supporting said linkage and said platform during movement thereof into and out of said compartment, said roller means being adapted to travel on said track.

7. A rack for retractably supporting battery means from a relatively stationary frame, said rack comprising a platfom for carrying said battery means, four links having their ends connected together by pivotal joints to form a parallelogram, the first of said joints being secured to said platform and the diagonally opposite joint being adapted to be secured to said frame, a pair of arms secured to each other by a second diagonally opposite joint, said arms being secured to the links connected together by said first joint to form a second parallelogram substantially similar to said first parallelogram, said second diagonal joint having roller means thereon, a track secured to said frame for supporting said linkage and said platform during movement thereon into and out of said compartment, said roller means being positioned to travel along said track.

8. In a vehicle having a frame, means for retractably supporting a vehicle battery for movement into and out of a battery compartment, said means including a platform for carrying said battery means into and out of said compartment, a pantographic linkage having a joint pivotally secured to said frame for swinging movement thereabout and a joint pivotally secured to said platform, guide means secured to said frame to support said platform and said battery, anti-friction means secured to said linkage and being positioned thereon to travel along said guide means for moving said battery along a path determined by the shape of said guide means.

9. In a vehicle having a frame, means for retractably supporting the vehicle batteries for movement into and out of a battery compartment, said means including an overhead member secured to said frame in said battery compartment, a track formed on said overhead member, a platform for carrying said battery into and out of said compartment, a pantographic linkage pivotally secured to said platform and swingably suspended from said overhead member, said linkage including roller means adapted to travel on said track, said track being positioned to support said platform and said battery during movement thereof into and out of said compartment, said roller means and said track being adapted to control the path of movement of the platform into and out of said compartment.

10. In a vehicle having a frame with a battery compartment formed therein, means for supporting a battery for movement into and out of said compartment, said means comprising a platform for said battery, a first set of links pivotally connected together by a first set of joints to form a parallelogram, the first of said joints being connected to said frame to swingably support said links, the joint diagonally opposite from said first joint being connected to said platform, a second set of links connected to said first set of links to form a second parallelogram similar to said first parallelogram, a track secured to said frame, said second parallelogram having rollers positioned to travel on said track.

11. In a vehicle having a battery compartment, means for supporting a battery for movement into and out of said compartment, said means comprising an overhead member secured to said frame, said overhead member having a track thereon, a platform for said battery, four links pivotally connected together by a first set of joints to form a parallelogram, the first of said joints being connected to said overhead member to swingably support said links, the joint diagonally opposite from said first joint being connected to said platform, a pair of arms connected together by a second diagonally opposite joint, said arms being connected to the links joined by said first joint to form a second parallelogram similar to said first parallelogram and roller means on said second diagonal joint positioned to travel on said track for carrying said platform during movement thereof into and out of said compartment.

12. In a vehicle having a frame with a battery compartment formed therein, means for supporting a battery for movement into and out of said compartment, said means comprising a platform for said battery, a track secured to said frame, a pantographic linkage pivotally secured to said frame and said platform, said linkage being adapted to swing from one position when said platform is in said compartment to another position when said platform is out of said compartment, said linkage having roller means thereon adapted to travel along said track to help support said platform and said battery, said roller means being positioned on said linkage to engage said track and to cause said battery to follow a path similar to the shape of said track, one of the links of said linkage being positioned to engage said platform when said linkage is in one position and another of the links in said linkage being positioned to engage said platform when said linkage is in the other of said positions.

13. In a vehicle having frame means and including a battery compartment having a rack with a platform for carrying a battery into and out of said compartment, lock means comprising a handle pivotally connected to said platform, grip means on one end of said handle, a resiliently deflectable member projecting from said platform, the opposite end of said handle engaging one side of said resiliently deflectable member, when said grip is in one position said opposite end forcing another side of said resiliently deflectable member against said frame means to support at least a portion of the weight of said platform, when said grip is in another position said resiliently deflectable member being free to disengage said frame means.

References Cited in the file of this patent
UNITED STATES PATENTS

| | | |
|---|---|---|
| 1,529,032 | Meisner et al. | Mar. 10, 1925 |
| 1,640,664 | Moore | Aug. 30, 1927 |
| 2,185,033 | Melcher | Dec. 26, 1939 |
| 2,607,433 | Simi | Aug. 19, 1952 |
| 2,609,268 | Nye | Sept. 2, 1952 |